(12) United States Patent
Dash et al.

(10) Patent No.: US 12,047,876 B2
(45) Date of Patent: Jul. 23, 2024

(54) MULTI-RADIO WIRELESS TRANSCEIVER POWER CONSERVATION

(71) Applicant: MAXLINEAR, INC., Carlsbad, CA (US)

(72) Inventors: Debashis Dash, Newark, CA (US); Joe Chow, Duluth, GA (US); Sam Heidari, Los Altos Hills, CA (US); Hossein Dehghan, Diablo, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 0 days.

(21) Appl. No.: 15/995,089

(22) Filed: May 31, 2018

(65) Prior Publication Data
US 2019/0373546 A1 Dec. 5, 2019

(51) Int. Cl.
*H04W 52/02* (2009.01)
*H04W 24/08* (2009.01)
*H04W 84/12* (2009.01)

(52) U.S. Cl.
CPC ....... *H04W 52/0219* (2013.01); *H04W 24/08* (2013.01); *H04W 84/12* (2013.01)

(58) Field of Classification Search
CPC .. H04W 52/0206; H04W 88/08; H04W 28/18
See application file for complete search history.

(56) References Cited

U.S. PATENT DOCUMENTS 7,570,956 B2 * 8/2009 Bigham ................ H01Q 1/246
455/446
8,073,073 B2 12/2011 Navidpour et al.
(Continued)

FOREIGN PATENT DOCUMENTS

| CN | 103391602 A | 11/2013 |
| CN | 105379410 A | 3/2016 |
| WO | 2018024199 A1 | 2/2018 |

OTHER PUBLICATIONS

Daniel Halperin; B. Greenstein; A. Sheth; D.Witherall; "Demystifying 802.11n Power Consumption"; University of Washington and Intel Labs Seattle; Proceedings HotPower '10 Proceedings of the 2010 Internatoinal Conference on Power aware Computing and Systems, Article No. 1; Vancouver BC Canada; USENIX Association Berkeley, CA; 2010.
(Continued)

*Primary Examiner* — Romani Ohri
(74) *Attorney, Agent, or Firm* — Buchalter; Jason W. Croft

(57) ABSTRACT

A wireless transceiver having radios which radios that support wireless communications with associated stations on a corresponding wireless local area network (WLAN). The wireless transceiver also includes: a utilization monitoring circuit, an association targeting circuit, and a power backoff circuit. The utilization monitoring circuit monitors communications between each of the radios and its associated stations. The association targeting circuit identifies, from the monitored communications of the utilization monitoring circuit, an underutilized one of the radios as a target radio for re-associating stations currently associated with at least one other radio and initiates the re-association with the (Continued)

US 12,047,876 B2
Page 2 target radio of the stations currently associated with the at least one other radio. The power backoff circuit reduces power to the at least one other radio.

22 Claims, 4 Drawing Sheets

(56) References Cited

U.S. PATENT DOCUMENTS

| | | | |
|---|---|---|---|
| 8,180,304 B2 | 5/2012 | Ma et al. | |
| 8,626,109 B2* | 1/2014 | Ma | H04B 7/0871 |
| | | | 455/343.2 |
| 9,319,950 B2 | 4/2016 | Seok | |
| 9,420,530 B1* | 8/2016 | Duxbury | H04W 52/0206 |
| 9,667,301 B1 | 5/2017 | Nassiri Toussi et al. | |
| 9,763,117 B2 | 9/2017 | Amini et al. | |
| 10,225,804 B2* | 3/2019 | Bharadwaj | H04W 52/146 |
| 11,228,941 B2 | 1/2022 | Shumka et al. | |
| 2006/0030318 A1* | 2/2006 | Moore | H04W 48/10 |
| | | | 455/434 |
| 2006/0146769 A1* | 7/2006 | Patel | H04W 52/0229 |
| | | | 455/574 |
| 2012/0108245 A1 | 5/2012 | Zhang et al. | |
| 2012/0165063 A1* | 6/2012 | Scalia | H04B 7/0608 |
| | | | 455/517 |
| 2013/0109373 A1* | 5/2013 | Watanabe | H04W 28/18 |
| | | | 455/422.1 |
| 2015/0050962 A1 | 2/2015 | Takashima | |
| 2015/0050965 A1 | 2/2015 | Perry | |
| 2015/0146548 A1* | 5/2015 | Wang | H04W 52/04 |
| | | | 370/252 |
| 2015/0271829 A1* | 9/2015 | Amini | H04W 24/02 |
| | | | 370/329 |
| 2015/0365889 A1* | 12/2015 | Rajendran | H04W 16/08 |
| | | | 455/453 |
| 2016/0127459 A1* | 5/2016 | Qi | H04L 67/104 |
| | | | 370/312 |
| 2016/0360489 A1 | 12/2016 | Boodannavar et al. | |
| 2018/0109907 A1 | 4/2018 | Amini et al. | |

OTHER PUBLICATIONS

International Search Report for corresponding PCT Application No. PCT/US2019/034742, dated Aug. 20, 2019, 5 pages.
Examination Report in European Application No. 19732504.6 dated Feb. 21, 2023.
Examination Report in European Application No. 19732504.6 dated Jun. 27, 2022.
Examination Report in European Application No. 19732504.6 dated Sep. 28, 2021.
Huang C., "Improving Long-Range Wireless Communication Link Performance Using Wireless LAN Technology", Research and Practice of High-Performance Remote Radio Communication Link, Southeast Communication, No. 10, Oct. 28, 2006, 4 Pages.
International Preliminary Report on Patentability for International Application No. PCT/US2019/034742, dated Dec. 10, 2020, 9 Pages.
Office Action for Chinese Application No. 201980036176.3, dated Nov. 27, 2023, 16 pages.
Notice of Allowance of Chinese Patent Application No. 201980036176.3 dated May 17, 2024, 10 pgs with translation.
Alcatel-Lucent et al., "Introduction of Stage 2 text for LTE-WiFi integration for legacy WLAN", 3GPP TSG-WG2 Meeting #92, Anaheim, USA, Nov. 16-20, 2015, Issue No. TSGR2_92, 13 pgs.
Long et al., "Distrubuted Joint Control Based on IEEE802.11 Protocol", Computer Engineering, vol. 34, No. 14, Jul. 2008, pp. 101-103 with Abstract translation.

* cited by examiner

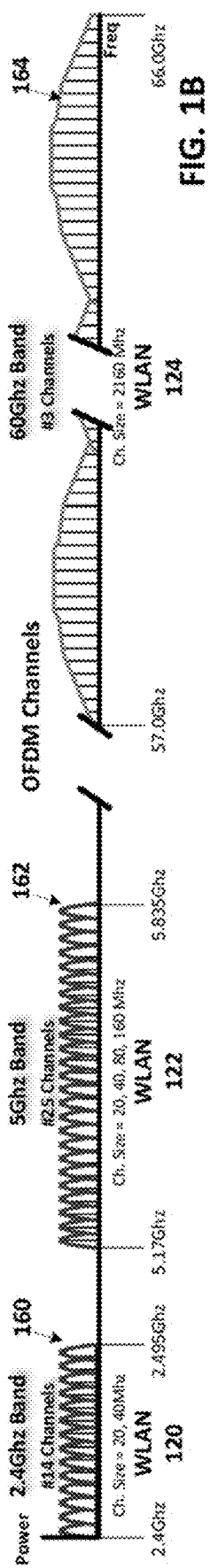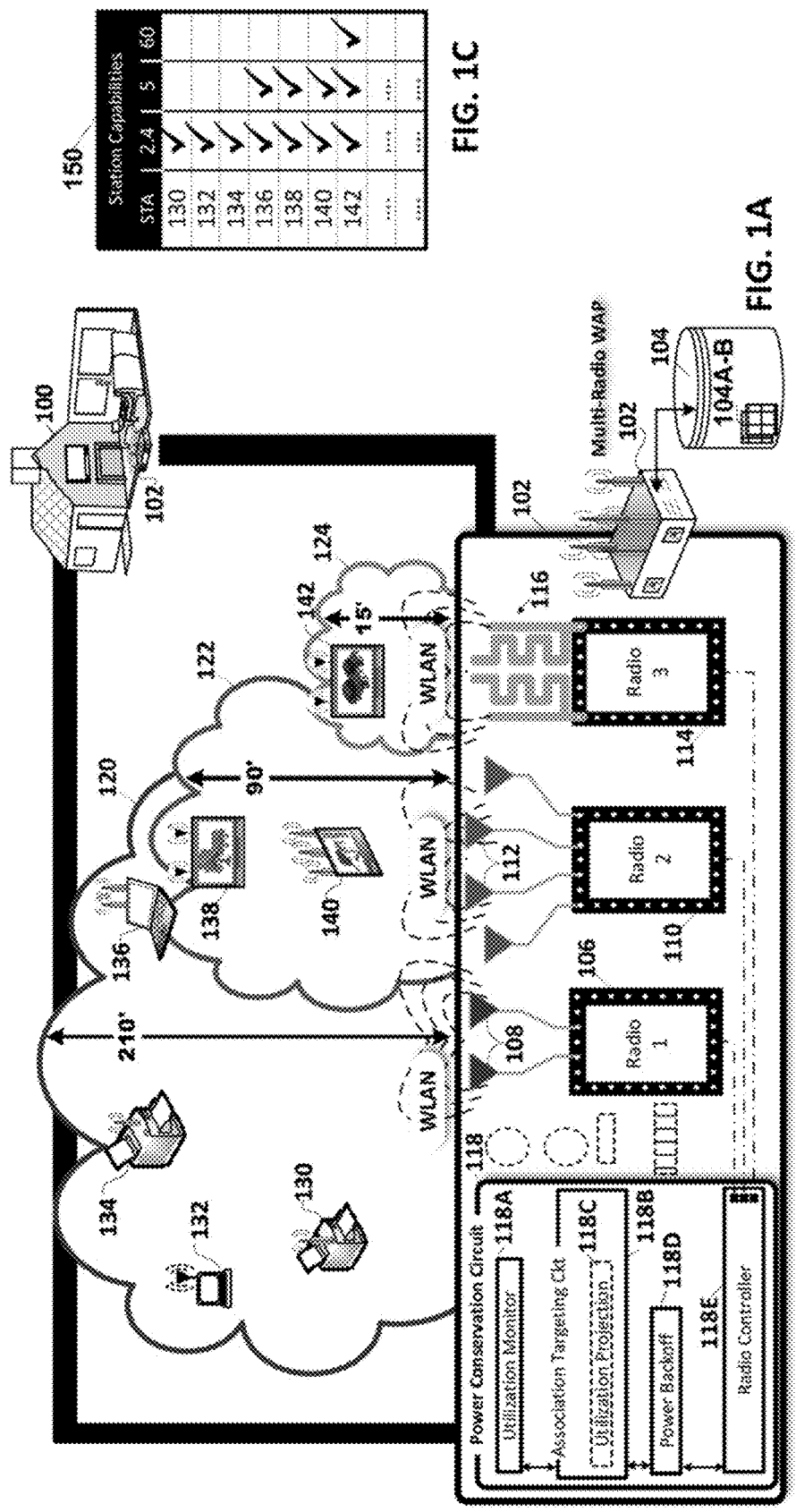
FIG. 1A
FIG. 1B
FIG. 1C

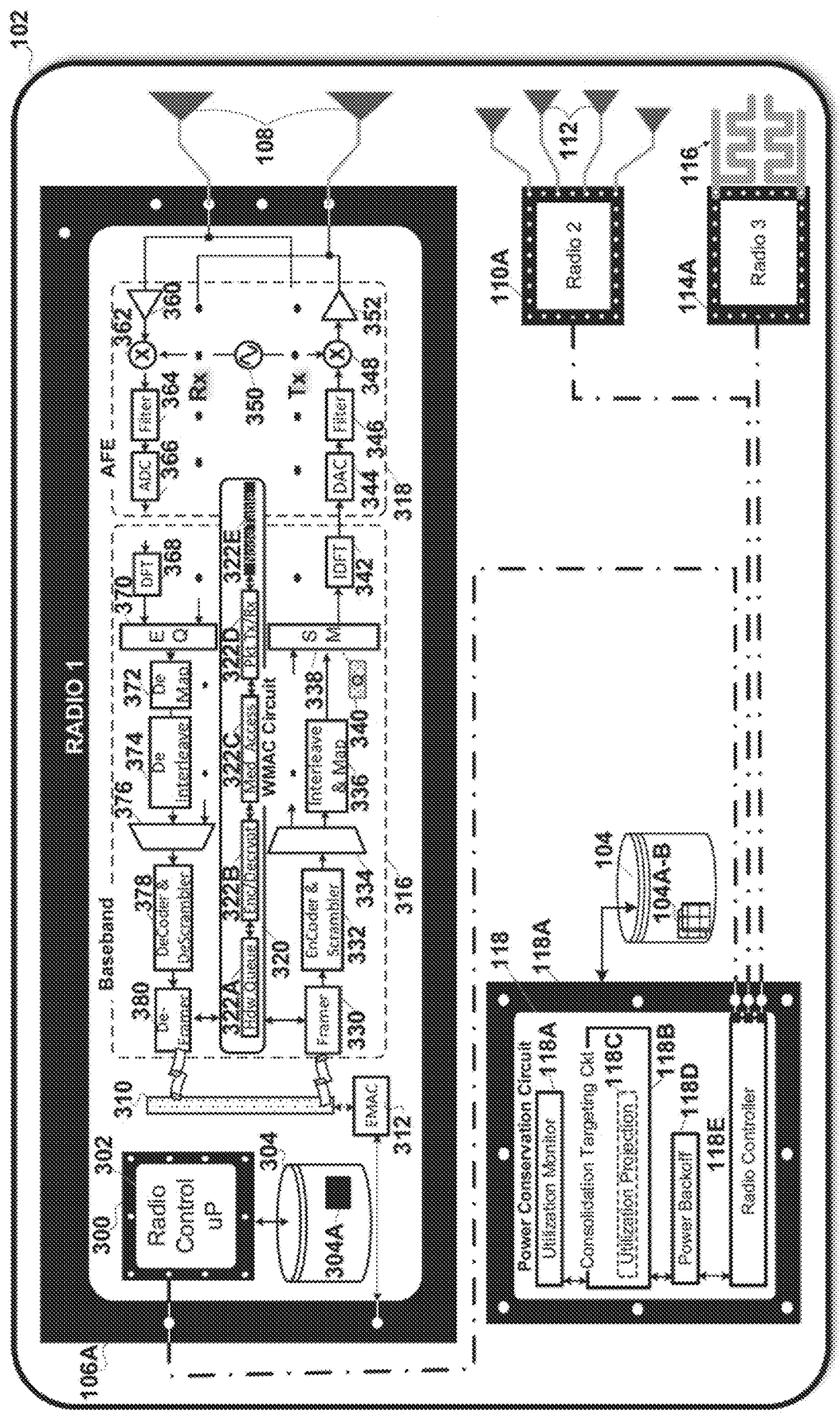
FIG. 3  Multi-Band Transceiver with Power Conservation

Method for Multi-Radio Transceiver Power Conservation

MULTI-RADIO WIRELESS TRANSCEIVER POWER CONSERVATION

BACKGROUND OF THE INVENTION

1. Field of Invention

The field of the present invention relates in general to wireless local area networks including wireless access points (WAP) and wireless stations and specifically enhanced multi-radio wireless transceivers therefor.

2. Description of the Related Art

Home and office networks, a.k.a. wireless local area networks (WLAN) are established using a device called a Wireless Access Point (WAP). The WAP may include a router. The WAP wirelessly couples all the wireless stations on the WLAN to one another and to the Internet, through a Cable or Digital subscriber line. Wireless stations include: computers, tablets, cell phones, printers, televisions, digital video (DVD) players and Internet of Things (IoT) clients such as smoke detectors, door locks, etc. Most WAPs implement the IEEE 802.11 standard which is a contention based standard for handling communications among multiple competing stations for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax". Communications follow a hub and spoke model with a WAP at the hub and the spokes corresponding to the wireless links to each 'client' device, a.k.a. station.

After selection of a communication channel(s) for the associated home network, access to the shared communication channel(s) relies on a multiple access methodology identified as Collision Sense Multiple Access (CSMA). Communications on the single communication medium are identified as "simplex" meaning, one communication stream from a single source node to one or more target nodes at one time, with all remaining nodes capable of "listening" to the subject transmission. CSMA provides a distributed random access methodology for sharing a single communication medium. Stations contend for a communication link to the WAP, and avoid collisions with one another when doing so, by initiating a link only when monitored energy levels indicate the medium is available.

With the adoption in the IEEE 802.11n standard of multiple-input multiple-output (MIMO) communications the communications throughput capacity on the 2.4 GHz or 5 GHz communication bands was greatly enhanced with the Introduction of 4×4 MIMO communications. MIMO multiplies the capacity of a wireless communication link using multipath propagation between multiple transmit and receive antennas, a.k.a. the MIMO antenna arrays, on the WAP and the station on either end of a communication link.

Starting with the IEEE 802.11ac standard and specifically Wave 2' thereof, discrete communications to more than one target node at the same time may take place using what is called Multi-User (MU) MIMO capability of the WAP with up to 8 antennas supporting 8 communication streams, a.k.a. 8×8 MIMO. MU capabilities were added to the standard to enable the WAP to transmit downlink communications to multiple stations concurrently, thereby increasing the time available for discrete MIMO video links to wireless HDTVs, computers tablets and other high throughput wireless devices. The IEEE 802.1 lad standard codified support for communications on the 60 GHz bang. The IEEE 802.1 lax standard expanded MU MIMO capabilities to include concurrent uplinks from two or more stations to the WAP.

Multi-radio transceivers have recently been introduced which incorporate in a single WAP, multiple wireless radios each supporting a wireless local area network (WLAN) on corresponding channels of one or more wireless communication bands, e.g. 2.4 GHz, 5 GHz, or 60 GHz bands. Each communication band has its own wireless protocol and channel width and number of channels.

What is needed are methods for improving the performance of these multi-radio transceivers.

SUMMARY OF THE INVENTION

The present invention provides a method and apparatus for a wireless transceiver having a plurality of components coupled to one another to form transmit and receive chains of a plurality of radios each of which radios supports wireless communications with associated stations on a corresponding wireless local area network (WLAN). The wireless transceiver also includes: a utilization monitoring circuit, an association targeting circuit, and a power backoff circuit. The utilization monitoring circuit monitors communications between each of the plurality of radios and its associated stations. The association targeting circuit identifies, from the monitored communications of the utilization monitoring circuit, an underutilized one of the radios as a target radio for re-associating stations currently associated with at least one other radio among the plurality of radios and initiates the re-association with the target radio of the stations currently associated with the at least one other radio. The power backoff circuit is responsive to the association targeting circuit to reduce power to the at least one other radio of the plurality of radios.

The invention may be implemented in hardware, firmware or software.

Associated methods and circuits are also claimed.

BRIEF DESCRIPTION OF THE DRAWINGS

These and other features and advantages of the present invention will become more apparent to those skilled in the art from the following detailed description in conjunction with the appended drawings in which:

FIGS. 1A-C are respectively a system view, a bandplan and a station capabilities table of a representative multi-radio wireless transceiver with a power conservation circuit in accordance with an embodiment of the invention;

FIG. 3 is a detailed circuit diagram of the multi-radio wireless transceiver with multiple radios each supporting communications with associated stations on a corresponding one of three communication bands, and operating under control of the power conservation circuit, in accordance with an embodiment of the invention.

DETAILED DESCRIPTION OF THE EMBODIMENTS

Figure 2D:
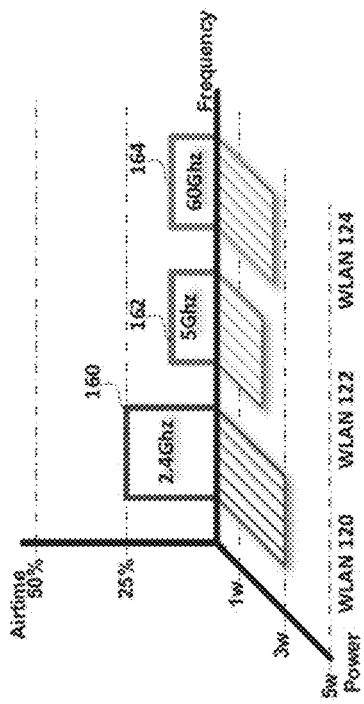
FIGS. 2A-B, 2C-D are system view and bandplan graphs of the multi-radio wireless transceiver before and after a consolidation of communications onto a single communication band under control of the power conservation circuit.

FIGS. 1A-C are respectively a system view, a bandplan and a station capabilities table of a representative multi-radio transceiver with a power conservation circuit in accordance with an embodiment of the invention.

FIG. 1A is the system view of the multi-radio wireless transceiver 102 in home 100. In this embodiment of the invention the multi-radio transceiver operates as a wireless access point (WAP) which includes three transceivers, a.k.a. radios: 106, 110, 114. Each radio supports wireless communications with associated ones of the stations 130-142 on a corresponding one of three wireless local area networks (WLAN)s 120-124. In this embodiment of the invention, Radio 106, compliant with the IEEE 802.11n standard, operates in the 2.4 Ghz band, and has the broadest coverage (210 feet) and lowest throughput (600 Mbps) of the three radios. Radio 106 provides WLAN 120 to associated stations, e.g. stations 130-136. Radio 110, compliant with the IEEE 802.11ac standard, has a coverage of 90 feet and throughput of 3.2 Gbps in the 5 Ghz band. Radio 110 provides WLAN 122 to associated stations, e.g. stations 138-140. Radio 114 is compliant with the IEEE 802.1 lad standard and operates in the 60 GHz band with the narrowest coverage of 15 feet, and the highest throughput of 7 Gbps of the three radios. Radio 114 provides WLAN 124 to associated stations, e.g. station 140. Each radio may include support for multiple-input multiple-output (MIMO) communications. In the embodiment shown all three radios support MIMO wireless communications. Radio 106 has two external antennas 108; radio 110 has four external antennas 112, and radio 114 has two patch antennas 116. Each radio operates under control of the power conservation circuit 118 integral with the WAP. In an alternate embodiment of the invention two or more of the radios may include support for communications in the same band, e.g. the 2.4 Ghz band, and provide distinct WLANs to their associated stations in that band.

The power conservation circuit 118 determines which if any radios can be subject to a reduction in power during intervals of low demand to reduce overall power consumption of the WAP. The power conservation circuit includes the following: a utilization monitoring circuit 118A, an association targeting circuit 118B, a power backoff circuit 118D, and radio controller circuit 118E. The utilization monitor circuit 118A monitors traffic and or airtime utilization on each of the WLANs. The association targeting circuit 118B utilizes input from the utilization monitor sub-circuit to identify any underutilized radio as a target radio for re-associating stations currently associated with another one of the radios. The association targeting circuit then initiates the re-association, subject in some instances to one or more preconditions. One such precondition, is that the re-associated stations have the capability to support communications with the target radio, specifically the communication band in which that radio operates, e.g. 2.4 GHz, 5 GHz or 60 GHz. Each radio determines station capabilities during a capabilities exchange which precedes association. The association targeting circuit is coupled to each radio and harvests these capabilities from each radio. FIG. 1C table 150, shows the capabilities of each radio as harvested by the association targeting circuit. The association targeting circuit stores these capabilities in capabilities records 140B in non-volatile storage 104. In an embodiment of the invention the match between the capabilities of the stations subject to re-association and the target radio is a precondition to re-association. The association targeting circuit conditionally initiates the re-association with the target radio based on a determination that the stations currently associated with the at least one other radio includes capabilities for supporting communications on the target radio.

In another embodiment of the invention a precondition to re-association is the utilization levels of the target radio and the other radio(s) selected for station dis-association. In an embodiment of the invention the association targeting circuit conditionally initiates the re-association with the target radio based on the projection that a resultant utilization metric of the target radio after re-association will not exceed a maximum utilization level. In another embodiment of the invention the association targeting circuit conditionally initiates the re-association with the target radio based on a projection that a resultant aggregate airtime metric of the target radio after re-association will not exceed a maximum airtime level. In still another embodiment of the invention the association targeting circuit conditionally initiates the re-association with the target radio based on a projection that a resultant aggregate traffic metric of the target radio after re-association will not exceed a maximum traffic level. The current utilization, e.g. airtime % or traffic amount, of the target radio must be low enough to take on the extra traffic/airtime without resultant congestion. Utilization can be defined as traffic amount, e.g. Mbps, or as Airtime percent. Quantifying the impact of re-association on the target radio's utilization can be determined with varying degrees of precision. Where the current utilization of the radio(s) whose station's will be re-associated is low enough, re-association may be practicable. In another embodiment of the invention the re-association targeting sub-circuit 118B includes a utilization projection sub-circuit 118C. This sub-circuit stores records 104A of each stations traffic, airtime and throughput requirements on any of the communication bands with which the station has previously been associated in non-volatile storage 104. The utilization projection sub-circuit uses these records to accurately project the aggregate traffic or airtime utilization requirements resulting from a prospective re-association, thus avoiding radio re-associations that would result in congested communications on the target band. The re-association may be proactively or reactively triggered. In an embodiment of the invention a transition management indicia, e.g. a bandswitch announcement, is transmitted by the radio(s) whose stations will be re-associated to those stations, identifying the target radio as the radio for re-association. In another embodiment of the invention the power backoff circuit initiates the re-association by reducing power to the radios whose stations will be re-associated.

In still another embodiment of the invention the association targeting circuit identifies an underutilized one of the radios when a utilization metric of the target radio exceeds a maximum utilization level, and re-associates enough stations from the target radio to the identified underutilized one(s) of the radios to reduce a level of the utilization metric for the target radio below the maximum utilization level.

The power backoff sub-circuit 118D implements via its connection to the radio controller sub-circuit 118E the reduction or shutoff of power to the radio(s) whose stations are subject to re-association. In various embodiments of the invention the power reduction may take one or more of the following forms: a shutoff of power on the radio(s) whose stations are re-associated, a termination of communications on the subject ratios or a reduction in the number of antennas and associated transmit and receive chains on those radio(s). These power reductions may be a condition precedent to re-association, in which case the stations in reaction to the power reduction, initiate the re-association with the target radio themselves. Alternately, the power reductions may be a condition subsequent to re-association in which case power is reduced after the stations have re-associated with the target radio.

FIG. 1B shows a representative set of IEEE 802.11 bandplans 160-164, one or more of which may be supported by corresponding ones of WAP's radios. Radio 106 operates WLAN 120 in the 2.4 GHz band 160 on one or more of the 14 channels associated therewith. The channels are referred to as orthogonal frequency division multiplexed (OFDM) with each channel including a number of OFDM sub-channels or tones. Radio 110 operates WLAN 122 in the 5 GHz band 162 on one or more of the 25 OFDM channels associated therewith. Radio 116 operates WLAN 124 in the 60 GHz band 164 on one or more of the 3 OFDM channels associated therewith. In another embodiment of the invention Radio's 106 and 110 both operate on distinct channels in the 2.4 GHz band.

FIG. 1C shows the station capabilities table 150 showing support for one or more of the communication bands supported by the WAP of each of the stations in the home 100. All stations support communications on the 2.4 GHz band. Station 142 supports communications on any of the 3 bands supported by the WAP. Stations 136-140 support communications on either the 2.4 Ghz or 5 Ghz bands. Stations 130-134 only support communications on the 2.4 Ghz band.

FIGS. 2A-B, 2C-D are system view and bandplan graphs of the multi-radio transceiver before and after re-association of stations from corresponding ones of the three radios 106, 110, 114 to a single radio 106 under control of the power conservation circuit 118.

Figure 2B:
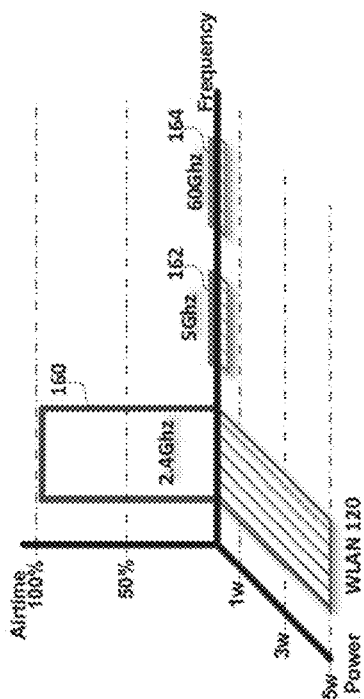
Figure 2C:
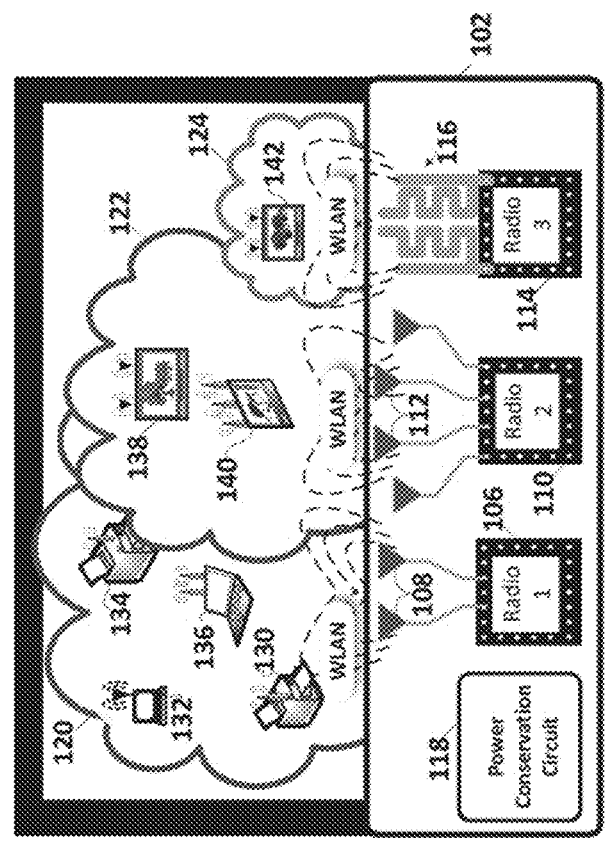
Figure 2A:
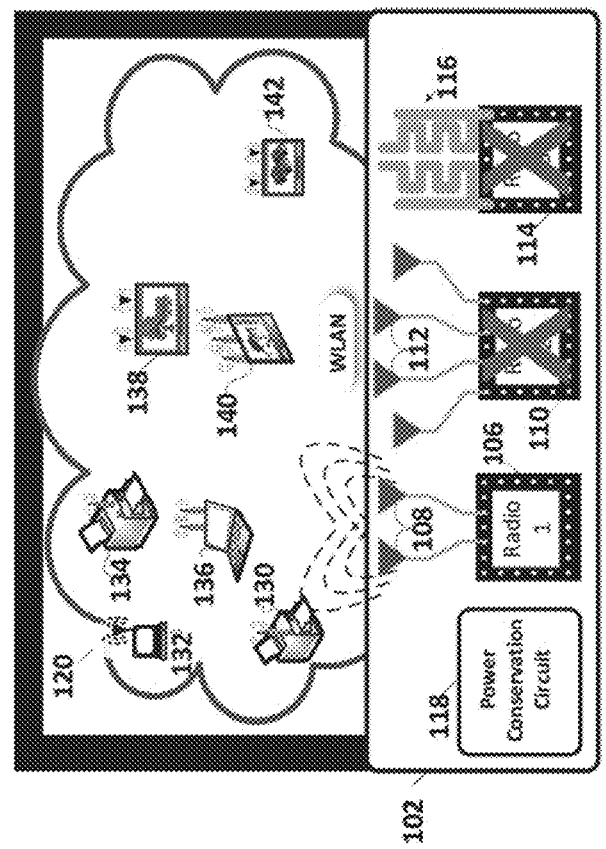

FIG. 2A is a system view of the multi-radio transceiver 102 in home 100 servicing each of stations 132-142 on a corresponding one of the WLANS 120-124 provided by a respective one of radios 106, 110, and 114. The overall power consumption of the WAP 102 is at a maximum as a result of the power consumption of the three active radios 106, 110, and 114.

FIG. 2B shows a bandplan graph of airtime vs power for each communication band and corresponding WLAN provided by the corresponding one of the three active radios as shown in FIG. 2A. Radios 106, 110, and 114 are shown consuming 3 watts, 1.25 Watts and 1.5 watts respectively. Power consumption will vary further based on traffic. In the example shown each radio is underutilized as reflected in the airtime required to service the corresponding associated stations. Radio 106 providing WLAN 120 on the 2.4 Ghz band 160 to stations 130-136 has airtime utilization of 25% of the WLAN's theoretical maximum capacity. Radio 110 providing WLAN 122 on the 5 Ghz band 162 to stations 138-140 has airtime utilization of 10% of the WLAN's theoretical maximum capacity. Radio 116 providing WLAN 124 on the 60 Ghz band 164 to station 142 has airtime utilization of 10% of the WLAN's theoretical maximum capacity.

FIG. 2C is the system view of the multi-radio transceiver 102 in home 100 after re-association of the stations 138-142 from radios 110 and 114 onto the single WLAN 120 provided by radio 106. The overall power consumption of the WAP 102 is at a minimum as a result of the shutoff of power to two of the three radios, i.e. radios 110, and 114, by the power conservation circuit 118.

FIG. 2D shows the bandplan graph of airtime vs power for each communication band after the consolidation shown in FIG. 2C. Radios 106, 110, and 114 are shown consuming 5 watts, 0 Watts and 0 watts respectively. Power consumption will vary further based on traffic. In the example shown, the power conservation circuit 118 has detected the underutilization of all 3 bands 160-164 shown in FIG. 2B and as a result has re-associated STATIONS 138-142 onto the single target radio 106 operating in the 2.4 GHz band, and reduced or shutoff the power to radios 110, 114 accordingly. Radio 106 providing WLAN 120 on the 2.4 Ghz band 160 to stations 130-142 has airtime utilization of 98% of the WLAN's theoretical maximum capacity. Radio 110 has been shutoff and thus no longer provides WLAN 122 on 5 Ghz band. In another embodiment of the invention the power reduction on radio 110 may not be quite as severe, e.g. maintaining power on 1 of the 4 communication chains servicing each antenna and shutting off power on the remaining 3 chains. Radio 114 has been shutoff and thus no longer provides WLAN 124 on the 60 Ghz band. In another embodiment of the invention the power reduction on radio 114 may not be quite as severe, e.g. maintaining the WLAN beacon but not accepting station association.

FIG. 3 is a detailed circuit diagram of the multi-radio transceiver 120 operative as a WAP, with multiple radios each supporting communications with associated stations and access to the Internet on a corresponding one of three communication bands, and operating under control of the power conservation circuit, in accordance with an embodiment of the invention. The WAP 120 in this embodiment of the invention contains 3 radios 106, 110, and 114, with a representative one of the MIMO radios 106 shown in a detail.

Radio 106 may be instantiated on one or more VLSI chips, e.g. chip 106A. Radio 106 is identified as a 2×2 multiple-input multiple-output (MIMO) WAP supporting as many as 2 discrete communication streams over its MIMO antenna array 108. The radio couples to the Internet via an Ethernet medium access control (EMAC) interface 312 over a cable, fiber, or digital subscriber line (DSL) backbone connection (not shown). A packet bus 310 couples the EMAC to the WiFi stage including a plurality of components for forming transmit and receive paths/chains for wireless uplink and downlink communications. The WiFi stage of radio 106 comprises: the MIMO WiFi baseband 316 stage, and the analog front end (AFE) and Radio Frequency (RF) stage 318.

In the baseband portion 316 wireless communications transmitted to or received from each associated user/client/station are processed. The baseband portion is dynamically configurable to support single or multi-user communications with the associated stations. The AFE and RF portion 318 handles the upconversion on each of transmit paths of wireless transmissions initiated in the baseband. The RF portion also handles the downconversion of the signals received on the receive paths and passes them for further processing to the baseband.

Transmission:

The transmit path/chain includes the following discrete and shared components. The WiFi medium access control (WMAC) component 320 includes: hardware queues 322A for each downlink and uplink communication stream; encryption and decryption circuits 322B for 16 encrypting and decrypting the downlink and uplink communication streams; medium access circuit 322C for making the clear channel assessment (CCA) and making exponential random backoff and re-transmission decisions; and a packet processor circuit 322D for packet processing of the communication streams. The WMAC component has a node table 322E which lists each node/station on the WLAN, the station's capabilities, the corresponding encryption key, and the priority associated with its communication traffic.

Each sounding or data packet for wireless transmission on the transmit path components to one or more stations is framed in the framer 330. Next each stream is encoded and scrambled in the encoder and scrambler 332 followed by demultiplexing into up to two streams in demultiplexer 334. Each stream is then subject to interleaving and mapping in a corresponding one of the interleaver mappers 336. Next downlink transmissions are spatially mapped in the spatial mapper 338 with a beamforming matrix, a.k.a. precoding matrix 'Q' 340. The spatially mapped streams from the spatial mapper are input to Inverse Discrete Fourier Transform (IDFT) component 342 for conversion from the frequency to the time domain and subsequent transmission on a corresponding one of the transmit chains in the AFE and RF stage 318.

The IDFT on each transmit path/chain is coupled to a corresponding one of the transmit path/chain components in the AFE/RF stage 318. Specifically, each of the IDFTs 342 couples to an associated one of the digital-to-analog converters (DAC) 344 for converting the digital transmission to analog. Next each transmit chain is filtered in filters 346, e.g. bandpass filters, for controlling the bandwidth of the transmissions. After filtration the transmissions are upconverted in upconverters 348 to the center frequency of the selected channel within the 2.4 Ghz band supported by this radio 106. Each upconverter is coupled to the voltage controlled oscillator (VCO) 350 for upconverting the transmission to the appropriate center frequency of the selected channel(s). Next, one or more stages of amplification are provided on each chain by power amplifiers 352. The power amplifiers on each of the two transmit chains in this radio are coupled to a corresponding one of the two antennas 108 for transmitting downlink communications to the associated stations.

Reception:

The receive path/chain includes the following discrete and shared components. Received communications on the transceiver's array of MIMO antenna 108 are subject to RF processing including downconversion in the AFE-RF stage 318. The station uplink received on the antennas 108 is amplified in a corresponding one of the low noise amplifiers 360. Downconverters 362 are coupled to the VCO 350 for downconverting the received signals on each chain. Each chain's received signal is then filtered in filters 364. Next, the downconverted analog signal on each chain is digitized in a corresponding one of the analog-to-digital converters (ADC) 366. The digital output from each ADC is passed to a corresponding one of the discrete Fourier transform (DFT) components 368 in the baseband portion 316 of the WiFi stage for conversion from the time to the frequency domain.

Receive processing in the baseband stage includes the following discrete and shared components. An equalizer 370 to mitigate channel Impairments, is coupled to the output of the DFTs 368. The received streams at the output of the equalizer are subject to demapping and deinterleaving in a corresponding one of the demappers 372 and deinterleavers 374. Next the received stream(s) are multiplexed in multiplexer 376 and decoded and descrambled in the decoder and descrambler component 378, followed by de-framing in the deframer 380. The received communication is then passed to the WMAC component 320 where it is decrypted with the decryption circuit 322B and placed in the appropriate upstream hardware queue 322A for upload to the Internet.

The WAP also includes a radio control processor 300 for instantiating radio control functions 302 provided by program code 304A in non-volatile memory 304. The radio control functions instantiated on processor 300 include responsiveness to requests and instructions from the power conservation circuit 118.

The 5 GHz radio 110 may be instantiated on one or more VLSI chips, e.g. chip 110A. Radio 110 is identified as a 4×4 MIMO WAP supporting as many as 4 discrete communication streams over its MIMO antenna array 112. Radio 110 instantiated on one or more chips 110A includes components similar to those discussed above in connection with the 2.4 GHz radio 106. The radio control processor of radio 110 is also coupled to and responsive to requests and instructions from the power conservation circuit 118.

The 60 GHz radio 114 may be instantiated on one or more VLSI chips, e.g. chip 114A. Radio 114 is identified as a 2×2 MIMO WAP supporting as many as 2 discrete communication streams over its MIMO patch antenna array 116. Radio 114 instantiated on one or more chips 114A also includes components similar to those discussed above in connection with the 2.4 GHz radio 106. The radio control processor of radio 114 is also coupled to and responsive to requests and instructions from the power conservation circuit 118.

The power conservation circuit 118 may also be implemented on very large scale Integrated circuit as a discrete chip 118A or as part of a chip. The power conservation circuit 118 determines which if any radios can be subject to a reduction of power during intervals of low demand to reduce overall power consumption of the WAP. The power conservation circuit includes the following subcircuits: utilization monitor 118A, association targeting 118B, power backoff 118D and radio controller 118E. The utilization monitoring circuit 118A monitors communications between the multi-radio wireless transceiver and associated stations on corresponding ones of the plurality of communication bands. The monitoring may include overall traffic or airtime on the WLANs or on each link of the WLANs. The utilization monitoring circuit obtains the traffic or airtime information via from the radio control circuit 302 and specifically the WMAC circuit 320 to which it is connected. Traffic amount or airtime requirements may be derived from either or both the hardware queues 322A for the uplink and downlink streams and the packet processor circuit 322D for packet processing the communication streams of each radio.

The association targeting circuit 118B utilizes input from the utilization monitor sub-circuit to identify any underutilized radio as a target radio for re-associating stations currently associated with another one of the radios. The association targeting circuit then initiates the re-association, subject in some instances to one or more preconditions. One such precondition, is that the re-associated stations have the capability to support communications with the target radio, specifically the communication band in which that radio operates, e.g. 2.4 GHz, 5 GHz or 60 GHz. Each radio determines station capabilities during a capabilities exchange which precedes association. The association targeting circuit is coupled to each radio and harvests these capabilities from each radio. FIG. 1C table 150, shows the capabilities of each radio as harvested by the association targeting circuit. The association targeting circuit stores these capabilities in capabilities records 1406 in non-volatile storage 104. In an embodiment of the invention the match between the capabilities of the stations subject to re-association and the target radio is a precondition to re-association. The association targeting circuit conditionally initiates the re-association with the target radio based on a determination that the stations currently associated with the at least one other radio includes capabilities for supporting communications on the target radio. The association targeting circuit obtains this capabilities information via the radio control circuit 302 of each radio and specifically the node table 322E of the WMAC circuit 320 of each radio to which it is coupled.

In another embodiment of the invention a precondition to re-association is the utilization levels of the target radio and the other radio(s) selected for station dis-association. In an embodiment of the invention the association targeting circuit conditionally initiates the re-association with the target radio based on the projection that a resultant utilization metric of the target radio after re-association will not exceed a maximum utilization level. In another embodiment of the invention the association targeting circuit conditionally initiates the re-association with the target radio based on a projection that a resultant aggregate airtime metric of the target radio after re-association will not exceed a maximum airtime level. In still another embodiment of the invention the association targeting circuit conditionally initiates the re-association with the target radio based on a projection that a resultant aggregate traffic metric of the target radio after re-association will not exceed a maximum traffic level. The current utilization, e.g. airtime % or traffic amount, of the target radio must be low enough to take on the extra traffic/airtime without resultant congestion. Utilization can be defined as traffic amount, e.g. Mbps, or as Airtime percent Quantifying the impact of re-association on the target radio's utilization can be determined with varying degrees of precision. Where the current utilization of the radio(s) whose station's will be re-associated is low enough, re-association may be practicable. In another embodiment of the invention the re-association targeting sub-circuit 118B includes a utilization projection sub-circuit 118C. This sub-circuit stores records 104A of each stations traffic, airtime and throughput requirements on any of the communication bands with which the station has previously been associated in non-volatile storage 104. The utilization projection sub-circuit uses these records to accurately project the aggregate traffic or airtime utilization requirements resulting from a prospective re-association, thus avoiding radio re-associations that would result in congested communications on the target band. The re-association may be proactively or reactively triggered. In an embodiment of the invention a transition management indicia, e.g. an 802.11 ac band switch announcement, an 802.11 lad fast session transfer, is transmitted by the radio(s) whose stations will be re-associated to those stations, identifying the band services by the target radio for re-association. In another embodiment of the invention the power backoff circuit initiates the re-association by reducing power to the radios whose stations will be re-associated.

In still another embodiment of the invention the association targeting circuit identifies an underutilized one of the radios when a utilization metric of the target radio exceeds a maximum utilization level, and re-associates enough stations from the target radio to the identified underutilized one(s) of the radios to reduce a level of the utilization metric for the target radio below the maximum utilization level.

The power backoff sub-circuit 118D implements via its connection to the radio controller sub-circuit 118E the reduction or shutoff of power to the radio(s) whose stations are subject to re-association. In various embodiments of the invention the power reduction may take one or more of the following forms: a shutoff of power on the radio(s) whose stations are re-associated, a termination of communications on the subject ratios or a reduction in the number of antennas and associated transmit and receive chains on those radio(s). These power reductions may be a condition precedent to re-association, in which case the stations in reaction to the power reduction, initiate the re-association with the target radio themselves. Alternately, the power reductions may be a condition subsequent to re-association in which case power is reduced after the stations have re-associated with the target radio.

Figure 4:
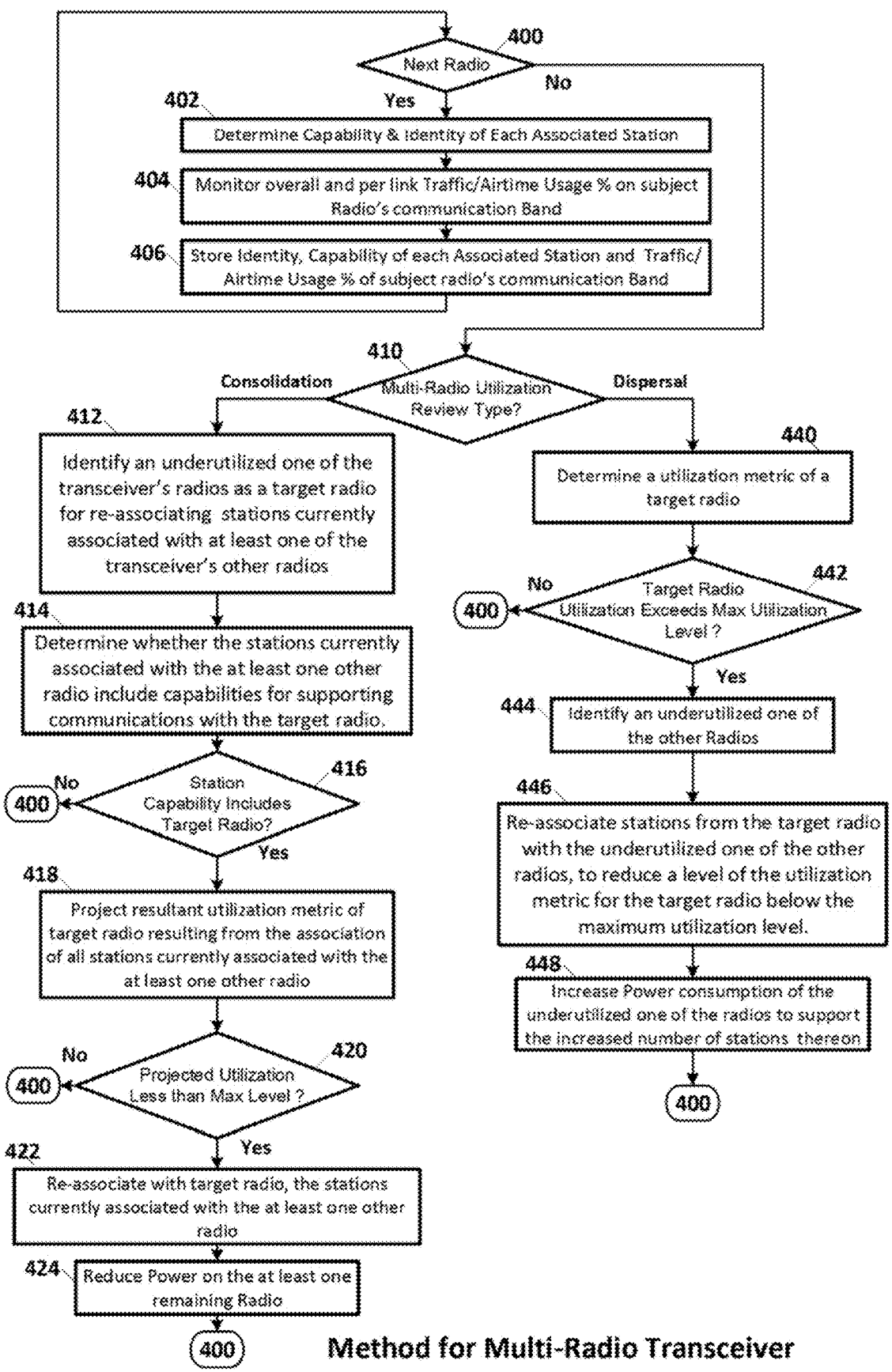
FIG. 4 is a process flow diagram of processes associated with conserving power on the multi-radio wireless transceiver.

FIG. 4 is a process flow diagram of processes associated with conserving power on the multi-radio transceiver 102. Processing begins with the interaction of the power conservation circuit with each of the radios on the multi-radio transceiver. In decision process 400 each radio in the multi-radio transceiver is queried to determine the capability and identify of each associated station in process 402. In decision proooss 404 each radio is queried to provide information required to monitor overall and per link Traffic or airtime usage percent for the associated stations on the subject radio's communication band. Next in process 406 the identity, capability traffic and or airtime usage percent of each associated station on the subject radio's communication band is stored by the power conservation circuit. After all radios have been analyzed control is passed to utilization review decision process 410.

In utilization review decision process 410 a determination is made as to the type of multi-radio utilization review to perform, i.e. a consolidation review or a dispersal review. A consolidation review involves determining which if any of the radios on the transceiver are underutilized and thus used as a target radio on which to consolidate stations currently associated with other radios on the transceiver. A dispersal review involves determining which if any of the radios on the transceiver are overutilized and thus require a dispersal of some associated stations to other ones of the transceiver's radios.

Where a determination is made in decision process 410 that a consolidation review will take place control is passed to process 412. In process 412 an underutilized one of the transceiver's radios is identified as a target radio for re-associating stations currently associated with at least one of the transceiver's other radios. Control is then passed to process 414 in which a determination is made as to whether the stations currently associated with the other radio include capabilities for supporting communications with the target radio. If they do not, then in decision process 416 control is returned to decision process 400. Alternately, if the stations on the other radio have the capability to support communications with the target radio then in decision process 416 control is passed to process 418. In process 418 a projection is made as to a resultant utilization metric, e.g. traffic or airtime, of the target radio resulting from the association of all stations currently associated with the at least one other radio. If in subsequent decision process 420 a determination is made that the projected utilization of the target radio will exceed a maximum utilization level, then control is returned to decision process 400. The maximum utilization level for each radio may for example be expressed as a maximum airtime utilization required to support communications of all stations associated with the radio, e.g. 90%. The maximum utilization level for each radio may alternately for example be expressed as a maximum amount of traffic required to support communications of all stations associated with the radio, e.g. 500 Mbps. Alternately, if in decision process 420 a determination is made that the projected utilization of the target radio is less than the maximum utilization level then control is passed to process 422. In process 422 the stations currently associated with the at least one other radio, are re-associated with the target radio. Next, in process 424 the power to the at least one other radio is reduced, and control is then returned to decision process 400.

Alternately, where a determination is made in decision process 410 that a dispersal review will take place control is passed to process 440. In process 440 a utilization metric, e.g. traffic or airtime, of the target radio is determined. Next in decision process 442 a determination is made as to whether the target radio's utilization exceeds the Maximum Utilization level for that radio. If it does not, then control returns to decision process 400. If alternately, the utilization of the target radio does exceed the maximum utilization level for that radio then control is passed to process 444. In process 444 underutilized ones of the other radios are identified. Next, in process 446 some of the stations from the target radio are re-associated with the underutilized one of the other radios, to reduce the level of the utilization metric for the target radio below the maximum utilization level. Next in process 448 the power consumption of the underutilized one(s) of the radios is increased to support communications with the increased number of stations thereon.

The components and processes disclosed herein may be implemented singly or in combination by: hardware, circuits, firmware, software, or a processor executing computer program code; coupled to the wireless transceiver's transmit and receive path components, without departing from the scope of the Claimed Invention.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A wireless transceiver comprising:
   a plurality of components coupled to one another to form transmit and receive chains of a plurality of radios, each radio supports wireless communications with associated stations on a corresponding wireless local area network (WLAN);
   a utilization monitoring circuit to:
     query a target radio of the plurality of radios to obtain information used to determine communications data for the associated stations on a communication band of the target radio, the communications data including an identity, overall traffic usage, overall airtime usage, per link traffic usage, and per link airtime usage;
     store the communications data of the associated stations on the communication band of the target radio;
   an association targeting circuit to identify, based on the communications data obtained by the utilization monitoring circuit, the target radio as an underutilized radio to handle subsequent communications for one or more of the associated stations currently associated with at least one other radio among the plurality of radios, and to initiate an association of the target radio with one of the stations that is currently associated with the at least one other radio; and
   a power backoff circuit to reduce power to the at least one other radio of the plurality of radios, wherein the power backoff circuit reduces the power in the at least one other radio of the plurality of radios based on the monitored communications and the initiation of the association of the target radio with the one of the stations, wherein subsequent to the reduction in power and while the power is reduced, the at least one other radio of the plurality of radios is operable to maintain a performance of at least one operation.

2. The wireless transceiver of claim 1, the association targeting circuit to conditionally initiate the association with the target radio based on a projection that a resultant utilization metric of the target radio after the association will not exceed a maximum utilization level.

3. The wireless transceiver of claim 1, the association targeting circuit to conditionally initiate the association with the target radio based on a projection that a resultant aggregate airtime metric of the target radio after association will not exceed a maximum airtime level.

4. The wireless transceiver of claim 1, the association targeting circuit to conditionally initiate the association with the target radio based on a projection that a resultant aggregate traffic metric of the target radio after association will not exceed a maximum traffic level.

5. The wireless transceiver of claim 1, the association targeting circuit to conditionally initiate the association with the target radio based on a determination that the stations currently associated with the at least one other radio include capabilities for supporting communications with the target radio.

6. The wireless transceiver of claim 1, the power backoff circuit to terminate communications on the at least one other radio of the plurality of radios.

7. The wireless transceiver of claim 1, wherein the power backoff circuit to reduce power to the at least one other radio of the plurality of radios comprises a power backoff circuit to reduce a number of active multiple-input multiple-output (MIMO) communication chains supporting communications on the at least one other radio of the plurality of radios.

8. The wireless transceiver of claim 1, the association targeting circuit to identify an underutilized one of the plurality of radios when a utilization metric of the target radio exceeds a maximum utilization level, and re-associating stations from the target radio to the identified underutilized one of the plurality of radios to reduce a level of the utilization metric for the target radio below the maximum utilization level.

9. The wireless transceiver of claim 1, wherein the association targeting circuit to transmit a transition management message to the stations currently associated with the at least one other radio, wherein the transition management message identifies the target radio for association.

10. The wireless transceiver of claim 1, operative as one of a wireless access point (WAP) transceiver or a mesh transceiver.

11. The wireless transceiver of claim 1, wherein the power backoff circuit reduces, without shutting off, the power in the at least one other radio of the plurality of radios based on the monitored communications and the initiation of the association of the target radio with the one of the stations.

12. The wireless transceiver of claim 1, wherein the at least one operation maintained while the power is reduced includes maintaining a WLAN beacon.

13. A method for operating a wireless transceiver having a plurality of radios, each radio supports wireless communications with associated stations on a corresponding wireless local area network (WLAN), the method comprising:
   querying a target radio of the plurality of radios to obtain information used to determine communications data for the associated stations on a communication band of the target radio, the communications data including an identity, overall traffic usage, overall airtime usage, per link traffic usage, and per link airtime usage;

storing the communications data of the associated stations on the communication band of the target radio;

identifying, based on the communications data, the target radio as an underutilized radios as a target radio to handle subsequent communications for one or more of the associated stations currently associated with at least one other radio among the plurality of radios;

conditionally associating, with the target radio, one or more of the stations currently associated with the at least one other radio, based on a projection that a resultant utilization metric of the target radio after association will not exceed a maximum utilization level; and reducing power to the at least one other radio of the plurality of radios, wherein the power backoff circuit reduces the power in the at least one other radio of the plurality of radios based on the monitored communications and the initiation of the association of the target radio with the one of the stations, wherein subsequent to the reduction in power and while the power is reduced, the at least one other radio of the plurality of radios is operable to maintain a performance of at least one operational.

14. The method for operating the wireless transceiver of claim 13, further comprising conditionally executing the associating based on a projection that a resultant aggregate airtime metric of the target radio after association will not exceed a maximum airtime level.

15. The method for operating the wireless transceiver of claim 13, further comprising conditionally executing the associating based on a projection that resultant aggregate traffic metric of the target radio after association will not exceed a maximum traffic level.

16. The method for operating the wireless transceiver of claim 13, further comprising conditionally executing the associating based on a determination that the stations currently associated with the at least one other radio among the plurality of radios include capabilities for supporting communications with the target radio.

17. The method for operating the wireless transceiver of claim 13, wherein the reducing further comprises at least one of:
  terminating communications on the at least one other radio among the plurality of radios; or
  shutting off power to the at least one other radio among the plurality of radios.

18. The method for operating the wireless transceiver of claim 13, wherein the reducing further comprises reducing a number of active multiple-input multiple-output (MIMO) communication chains supporting communications on the at least one other radio among the plurality of radios.

19. The method for operating the wireless transceiver of claim 13, wherein identifying the underutilized one of the radios as the target radio includes determining when a utilization metric of the target radio exceeds a maximum utilization level, and wherein associating, with the target radio, the one or more of the stations currently associated with at least one other radio among the plurality of radios includes results in a reduction of a level of the utilization metric for the target radio below the maximum utilization level.

20. The method for operating the wireless transceiver of claim 13, further comprising:
  transmitting a transition management message to the stations currently associated with the at least on other radio, wherein the transition management message identifies the target radio for association.

21. The method for operating the wireless transceiver of claim 13, further comprising one of:
  operating the wireless transceiver as a wireless access point (WAP) transceiver; or
  operating the wireless transceiver as a mesh transceiver.

22. The method for operating the wireless transceiver of claim 13, wherein the at least one operation maintained while the power is reduced includes maintaining a WLAN beacon.

* * * * *